United States Patent
Koski et al.

[11] Patent Number: 6,011,853
[45] Date of Patent: Jan. 4, 2000

[54] EQUALIZATION OF SPEECH SIGNAL IN MOBILE PHONE

[75] Inventors: Ari Koski; Janne Uitto; Jari Sjöberg, all of Tampere, Finland

[73] Assignee: Nokia Mobile Phones, Ltd., Salo, Finland

[21] Appl. No.: 08/711,302

[22] Filed: Aug. 30, 1996

[30] Foreign Application Priority Data

Oct. 5, 1995 [FI] Finland .................................. 954737

[51] Int. Cl.⁷ .................................................. H04R 29/00
[52] U.S. Cl. ............................................. 381/56; 381/103
[58] Field of Search .............................. 381/57, 103, 56, 381/66; 379/406, 411

[56] References Cited

U.S. PATENT DOCUMENTS

| | | | |
|---|---|---|---|
| 4,721,923 | 1/1988 | Bares et al. . | |
| 4,761,829 | 8/1988 | Lynk, Jr. et al. . | |
| 5,027,410 | 6/1991 | Williamson et al. . | |
| 5,034,984 | 7/1991 | Bose | 381/86 |
| 5,172,417 | 12/1992 | Iwamura | 381/103 |
| 5,285,165 | 2/1994 | Renfors et al. | 328/163 |
| 5,406,635 | 4/1995 | Jarvinen | 381/94 |
| 5,450,442 | 9/1995 | Umemoto et al. . | |
| 5,481,615 | 1/1996 | Eatwell et al. | 381/71.11 |
| 5,509,081 | 4/1996 | Kuusama | 381/57 |
| 5,606,550 | 2/1997 | Jangi | 379/411 |
| 5,680,468 | 10/1997 | Van Hout et al. | 381/57 |
| 5,696,819 | 12/1997 | Suizu et al. | 379/406 |
| 5,708,722 | 1/1998 | Forgues et al. | 381/57 |

FOREIGN PATENT DOCUMENTS

| | | |
|---|---|---|
| 0495360 A2 | 7/1992 | European Pat. Off. . |
| 0 642 230 A1 | 3/1995 | European Pat. Off. . |
| 0674415 A1 | 9/1995 | European Pat. Off. . |

OTHER PUBLICATIONS

Straub A.: Digitale Signalprozessoren, Finke Bausteine in der Mobilfunktechnik Funkschau Jan. 24, 1991, pp. 96–99.
Kontro J. et al.: Digital Car Audio System, IEEE Transactions on Consumer Electronics, vol. 39, No. 3, pp. 514–521, Aug. 1993.

Primary Examiner—Vivian Chang
Attorney, Agent, or Firm—Perman & Green, LLP

[57] ABSTRACT

The invention relates to equalization in a digital phone, advantageously a mobile phone. According to the invention, the equalization (4) of a reproduced sound is changed according to the operating conditions of the phone. Information about the conditions is obtained by monitoring the sound volume (19) set by the user, measuring the background noise (17) in the operating environment of the phone through the phone's microphone (9) and/or monitoring the quality (16) of the connection between the phone and the communication network. The low frequency emphasis is reduced in a very noisy environment and increased in a quiet environment. The telephone according to the invention is advantageously a mobile phone in a digital cellular network.

28 Claims, 8 Drawing Sheets

EQUALIZATION OF SPEECH SIGNAL IN MOBILE PHONE

BACKGROUND OF THE INVENTION

The invention relates in general to speech signal processing and in particular to equalization of a speech signal in a mobile phone in order to improve the intelligibility of transmitted speech.

It is a widely known and used method to improve the auditory effect of sound, and of speech, which is a special case of sound, with an equalizer. The frequency spectrum of a sound can be equalized, whereby the frequency response peaks or pits corresponding to certain frequencies are equalized closer to the average level, or certain frequencies or frequency areas can purposely be amplified or attenuated so that they deviate from the mean level. In addition to improving the auditory effect, equalization can also help people suffering from certain types of hearing defects discern sounds better.

Equalization can be performed electrically or mechanically. Electrical equalization requires the use of various filter circuits in the device that processes sound. Known solutions in the field of analog signal processing include passive RC filters, active filters based on operational amplifiers and special equalizer chips, and in the digital field, digital signal processors which can be programmed to realize very complex filter arrangements. Mechanical equalization is performed by selecting the mechanical properties of the loudspeaker reproducing sound and of its immediate vicinity such that a desired frequency response is achieved.

Figure 1:
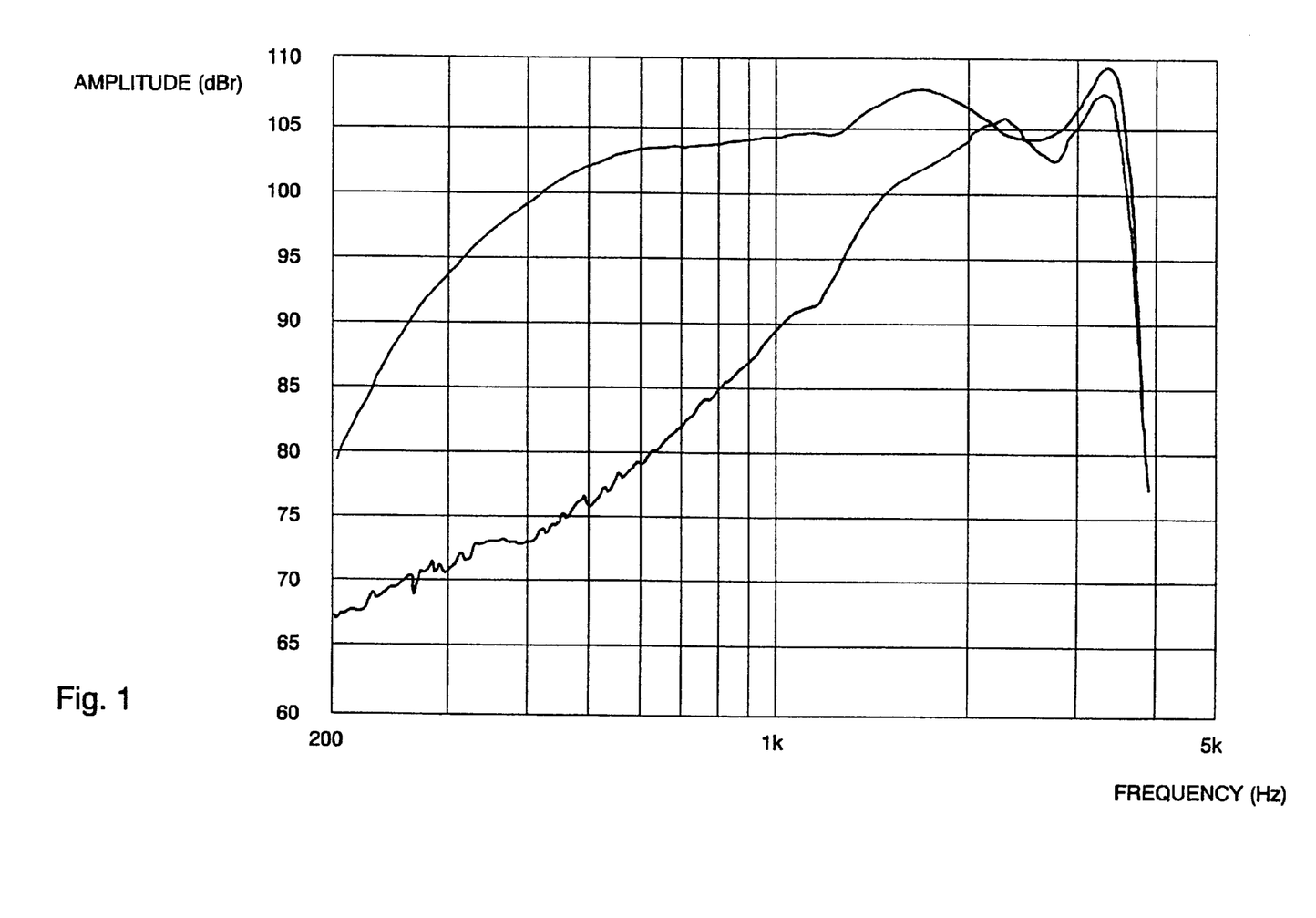

In mobile phones, equalization is needed to improve the quality and intelligibility of the sound that travels from the loudspeaker to the user's ear. The sound from the loudspeaker seems distorted because usually the loudspeaker does not reproduce all frequencies in the same way and because there occurs an acoustic leakage between the loudspeaker and the user's ear which affects different frequencies in different ways. FIG. 1 is a graph illustrating two frequency response measurements: in the measurement arrangement corresponding to the upper curve the loudspeaker and the instrument corresponding to an ear are protected against acoustic leakage (strong acoustic coupling) and in the arrangement corresponding to the lower curve the acoustic leakage corresponds to normal usage of a mobile phone. The figure shows clearly that as the acoustic coupling gets weaker because of the leakage, especially the reproduction of low frequencies (<1 kHz) gets worse.

A known method which has been used in attempting to equalize the distortion of sound is the use of special loudspeakers applying acoustic feedback. The method is of a mechanical nature, because in it an attempt is made to build the loudspeaker such that its mechanical properties compensate for the attenuation of low frequencies. An air gap is left between the loudspeaker and its mounting body, whereby the width of the air gap is a significant factor as regards acoustic feedback. To achieve correct dimensioning and operation, strict mechanical tolerances must be followed in the assembly of the loudspeaker, which increases manufacturing costs. The frequency response of the mechanical arrangement cannot be changed later, which makes the arrangement inflexible. Furthermore, the method cannot be applied in the implementation of a hands-free loudspeaker which is a widely used option in mobile phones.

By suitable design of the electromechanical properties, a loudspeaker can be realized which by nature amplifies low-frequency signals. Also this arrangement is inflexible, since the frequency response is determined in the manufacturing process of the loudspeaker and it cannot be changed e.g. with an electrical control signal.

Electrical filter solutions can usually affect the frequency response of a sound reproduction arrangement in a manner more versatile and flexible than can mechanical or electromechanical solutions. In a mobile phone, however, space, power consumption, computing capacity and printed circuit board area are very critical factors for which the electrical filter should have as low a demand as possible. Both passive and active analog filters increase component costs and consume electrical power as well as printed circuit board area. If one wishes to employ these to build an adjustable equalizer, the operation of which can be changed with a control signal according to need, the arrangement easily becomes complex and expensive to manufacture. In addition, analog filters often have a certain, rather limited, operation range, e.g. a fixed center frequency or insufficient amplification capacity.

Digital filter arrangements, which in principle can be realized as separate digital circuits but which advantageously are programmed into processes executed by a digital signal processor, have proven superior to their analog counterparts in many respects. Since most popular mobile phone constructions already include a digital signal processor, or DSP, the programmable filter arrangement does not significantly increase the number of components in a mobile phone. At the same time, power consumption and space requirements are kept within reasonable limits. In addition, the operation of processes programmed in a DSP can be easily changed in a desired way by bringing certain control signals to the processor.

However, prior art DSP-based equalizer arrangements in mobile phones do not function in an optimal manner in all situations. It is known that since mobile phones are used in a wide range of conditions, in which e.g. the ambient noise level both in the talking and in the listening environment varies, reproduction of speech in the best possible manner is impossible if equalization is always performed in the same way. In addition to the environmental conditions, the use of various auxiliaries, such as a hands-free loudspeaker, earphone loudspeaker or an additional loudspeaker, affects the operation required of the equalizer.

SUMMARY OF THE INVENTION

An object of this invention is to provide a method and a device for improving the quality and intelligibility of the sound reproduced by a mobile phone in several different situations. Another object of the invention is to provide a method and a device for controlling the quality and intelligibility of the sound reproduced by a mobile phone when various auxiliary equipments are used. A further object of the invention is to provide a method and a device for improving the sound reproduction in a mobile phone, which method and device do not require the use of complex and expensive special loudspeakers. A further object of the invention is that the method and the device according to it do not significantly increase the consumption of the critical resources in a mobile phone.

The objects of the invention are achieved with an arrangement in which a signal received by a mobile phone is adaptively equalized after the speech decoding but prior to signal D/A conversion. 'Adaptively' means that the effect of equalization is changed when certain control parameters change. The control parameters and their effects are described in more detail later.

The method according to the invention for improving the sound reproduction in a telephone apparatus including an equalizer which has a certain variable frequency response is characterized in that there is generated control information representing the operating conditions of said telephone apparatus, and the frequency response of said equalization is changed according to said control information in order to optimize the quality and intelligibility of the reproduced sound in the various operating conditions.

The invention is also directed to a telephone in which the method according to the invention is applied. The telephone apparatus according to the invention including a loudspeaker for sound reproduction and a digital signal processing means for digital processing of the sound to be reproduced, which digital signal processing means comprises an equalizer with a certain frequency response, is characterized in that it comprises a means for generating control information describing its operating conditions and a means for changing the frequency response of said equalizer on the basis of said control information.

The present invention is intended to be used in a digital telephone, advantageously a mobile phone. Applicability of the invention requires that the telephone handles sound as a digital-form signal. In a conventional mobile phone, the received sound information is in digital form before it is converted to an analog form (PCM de-coding) to be reproduced by a loudspeaker. In addition, the sound information to be transmitted is in a digital form, when it has first been recorded via a microphone and A/D converted (PCM coding). It is assumed that the operation of a digital mobile phone is known to one skilled in the art and it will not be discussed in more detail in this document.

During the research that lead to the invention it was observed that from the point of view of intelligibility of received speech it is not always recommended to amplify low frequencies only. If a mobile phone is used in a very noisy environment, amplification of low frequencies may even degrade the intelligibility of speech because it decreases, in the signal perceived by the ear, the proportion of higher frequency components, which are the most essential ones as far as intelligibility is concerned. Thereby it is advantageous to proportion the equalization to the ambient noise level. In addition, it has been observed that since auxiliaries of mobile phones employ different loudspeakers, equalization has to be adjusted so as to function in different ways in conjunction with them.

In accordance with the invention, several different control parameters can be used in the adjustment of the equalization, the most simple one being the phone sound volume set by the user. Other possible control parameters include the mesurement result for ambient noise level measured through the phone's microphone, information about auxiliaries connected to the phone and measurement results describing the quality of the radio connection. The final sound perceived by the user is the result of the combined effect of the original signal, equalization, possible bandpass filtering in conjunction with the D/A conversion, amount of gain, acoustic response of the loudspeaker and, in normal telephone operation, acoustic leakage between the loudspeaker and ear or, in the hands-free operation, acoustic transfer function of the listening space.

In the method and device according to the invention, the mobile phone finds out and determines on the basis of the control parameters and data stored in the memory which are the equalization gain and frequency area that are best suited to the environmental and operating conditions at a given moment of time. On the basis of that decision the received signal is equalized advantageously in the same digital signal processor that is used in a known way to perform speech decoding.

Compared to the prior art, the advantages of the invention include the improvement of the intelligibility of sound irrespective of the loudspeaker construction and the acoustic leakage between the loudspeaker and ear, good response to the special requirements of mobile phones, adaptation of equalization to background noise and to the phone volume set by the user, balance between the quality of the sound heard and the intelligibility of speech, and adaptation of equalization to auxiliaries of the mobile phone.

BRIEF DESCRIPTION OF THE DRAWINGS

The invention is described in more detail referring to the advantageous embodiments presented as examples and to the attached drawing in which FIG. 1 graphically illustrates frequency response measurements when there is a strong and a weak acoustic coupling between the loudspeaker and the measuring instrument.

DETAILED DESCRIPTION OF THE INVENTION

Above, in conjunction with the description of the prior art, we referred to FIG. 1, and so, below, in the description of the invention and its advantageous embodiments we will mainly refer to FIGS. 2 to 9. Like parts in the figures are denoted by like reference numbers.

Figure 2:
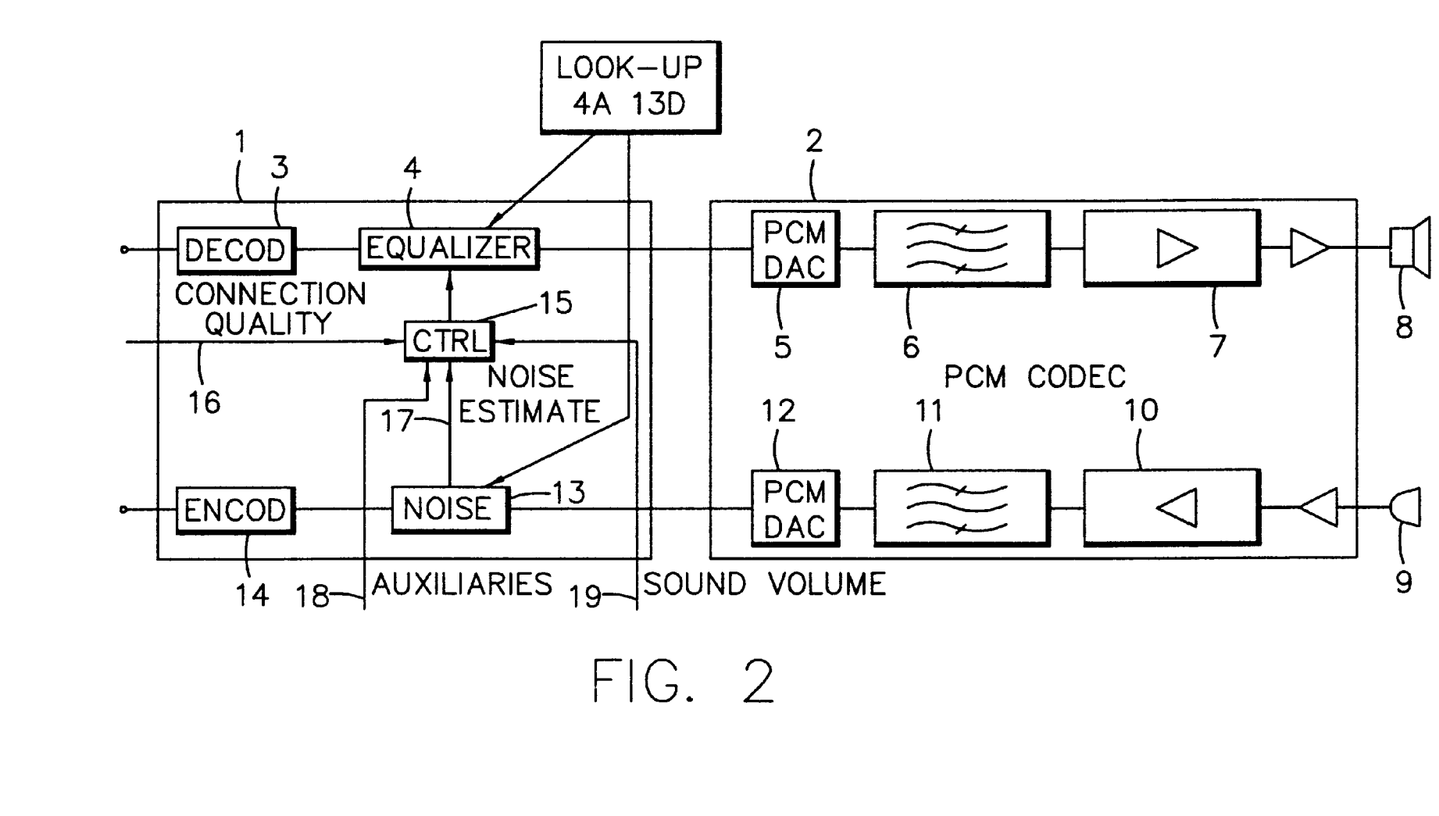
FIG. 2 is a block diagram illustrating the principle of the invention and its application in a mobile phone, FIGS. 3 to 5 graphically illustrate various frequency response curves that can be produced with the arrangement according to the invention.

FIG. 2 shows a block diagram the two main blocks of which are a digital signal processor (DSP) 1 responsible for the digital processing of a speech signal in a mobile phone, and the PCM CODEC block 2 responsible for the PCM coding and decoding of a signal and for the analog signal processing. A so-called far-end channel runs from left to right in the upper part of the figure; it is the signal path from the receiver and channel decoding (not shown) of a mobile phone via a speech decoder 3, equalizer block 4, D/A converter 5, filter 6 and amplifier/attenuator 7 to a loudspeaker 8. In the lower part of the figure there is a so-called near-end channel, or signal path from a microphone 9 via an amplifier 10, filter 11, A/D converter 12, background noise measuring block 13 and speech encoder 14 to the channel encoding (not shown) and transmission to the radio path. Except for the equalizer block 4 and background noise measuring block 13 according to the invention, the construction and operation of all listed parts are known to a person skilled in the art as corresponding parts are widely used in prior art mobile telephones. Also the blocks according to the invention comprise parts known to one skilled in the art, but their combined use in a mobile phone belongs to the scope of the present invention.

The DSP block 1 includes a control block 15 the main task of which, as regards the present invention, is to control the equalizer 4 so that signal components at certain frequencies are amplified or attenuated according to existing environmental and operating conditions. The operation of the control block 15 is based on control parameters which are brought to the control block 15 as input data. All control parameters somehow describe the environmental and operating conditions of the mobile phone. FIG. 2 shows as input data for the control block 15 four control parameters which are: information 16 representing the quality of the radio connection, background noise estimate 17 based on measurement of ambient noise level, information 18 describing the auxiliaries connected to the phone, and the phone volume 19 set by the user. In addition, FIG. 2 shows a storage means, ie. look-up tables 4a and 13d the use of which will be discussed later.

Figure 3:
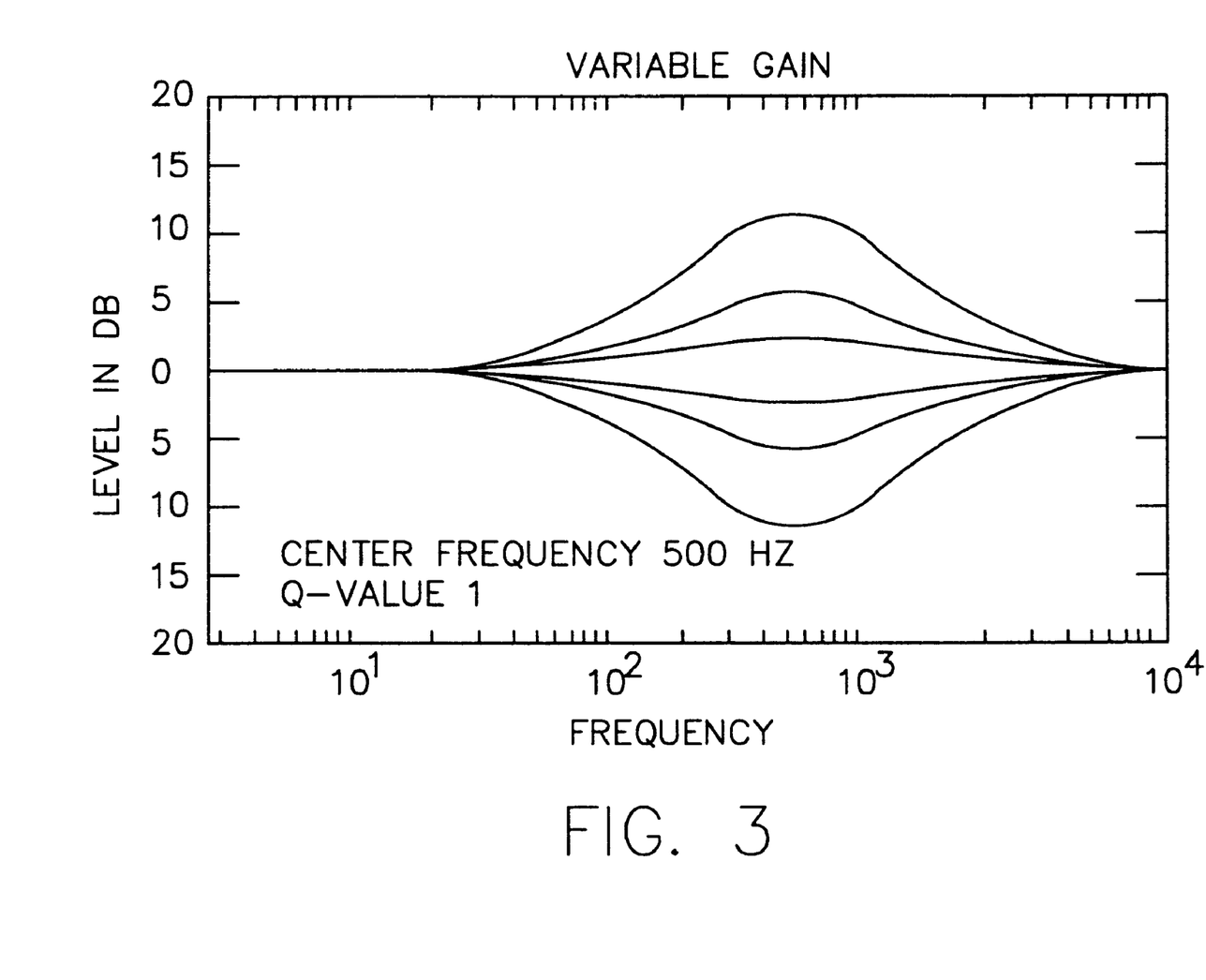
Figure 4:
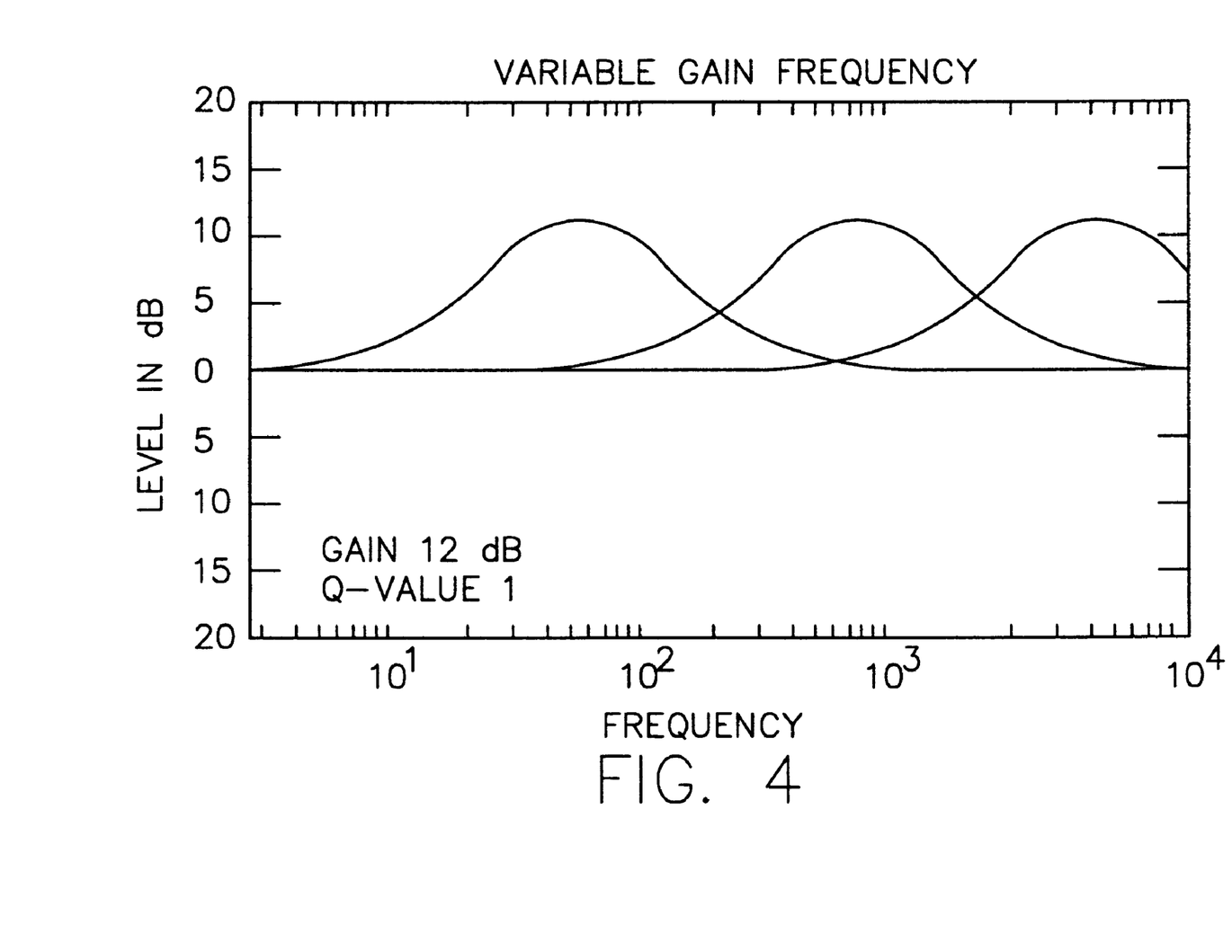
Figure 5:
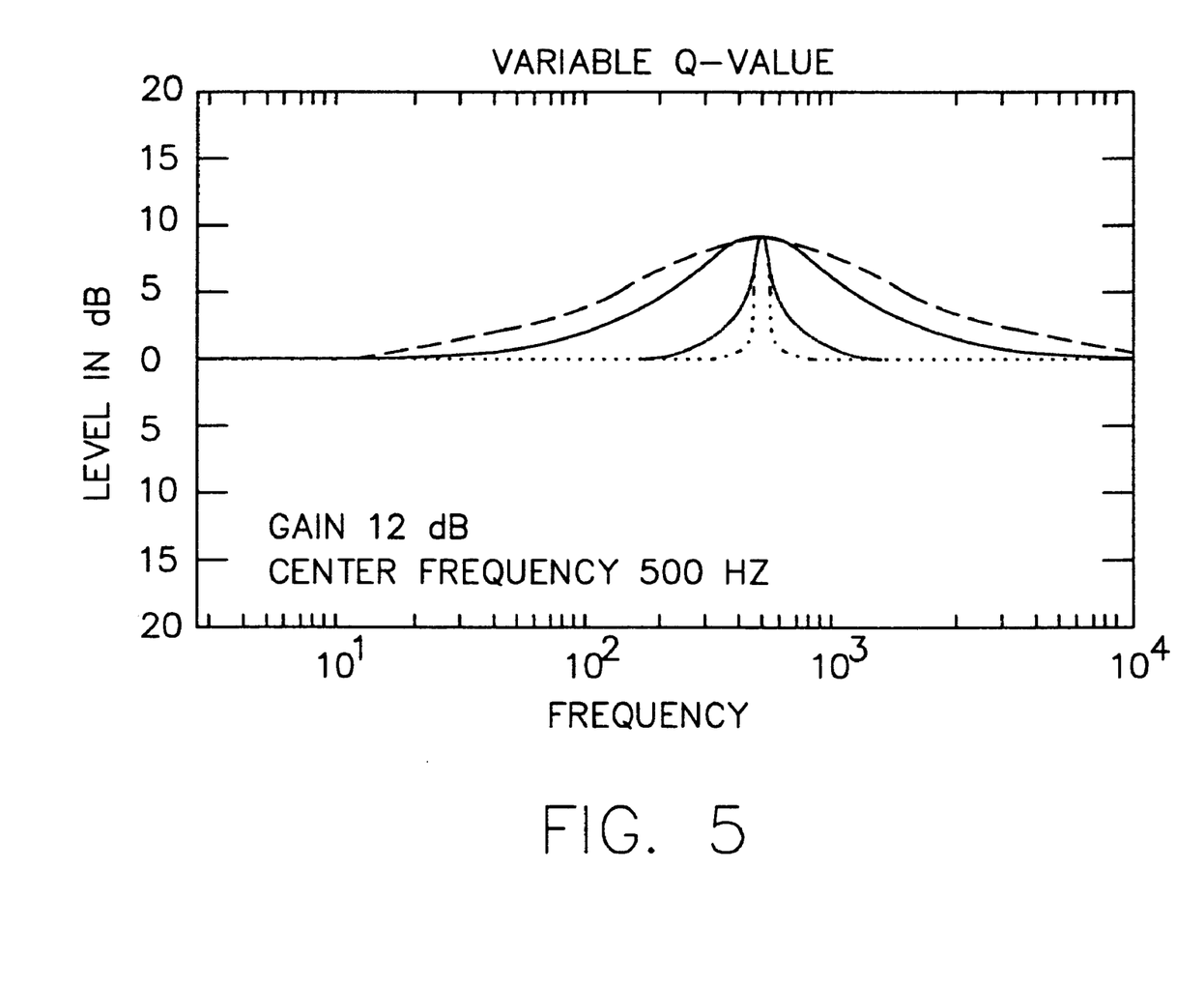

The frequency response of the equalizer 4 may vary in many ways. FIG. 3 shows, by way of an example, the variable gain when the center frequency and bandwidth are constant. Similarly, FIG. 4 shows, by way of an example, the variable center frequency when the gain and bandwidth are constant, and FIG. 5 shows, by way of an example, the variable bandwidth when the center frequency and gain are constant. Variations of the center frequency, gain and bandwidth can be combined in many ways to produce the best possible final result, ie. the clearest and most intelligible sound. The operations are advantageously performed in the normal voice frequency area, which is about 300 to 3400 Hz. A constant equalizer, which is not adaptive but operates always in the same way, can be considered a special case of the invention.

The equalizer block 4 may comprise e.g. one or more infinite impulse response (IIR) filters, finite impulse response (FIR) filters or processes operating in the frequency domain. In the latter case, block 4 must also include time-to-frequency and frequency-to-time transforms, which preferably are performed using the fast Fourier transform (FFT) and inverse fast Fourier transform (IFFT) functions.

Figure 6:
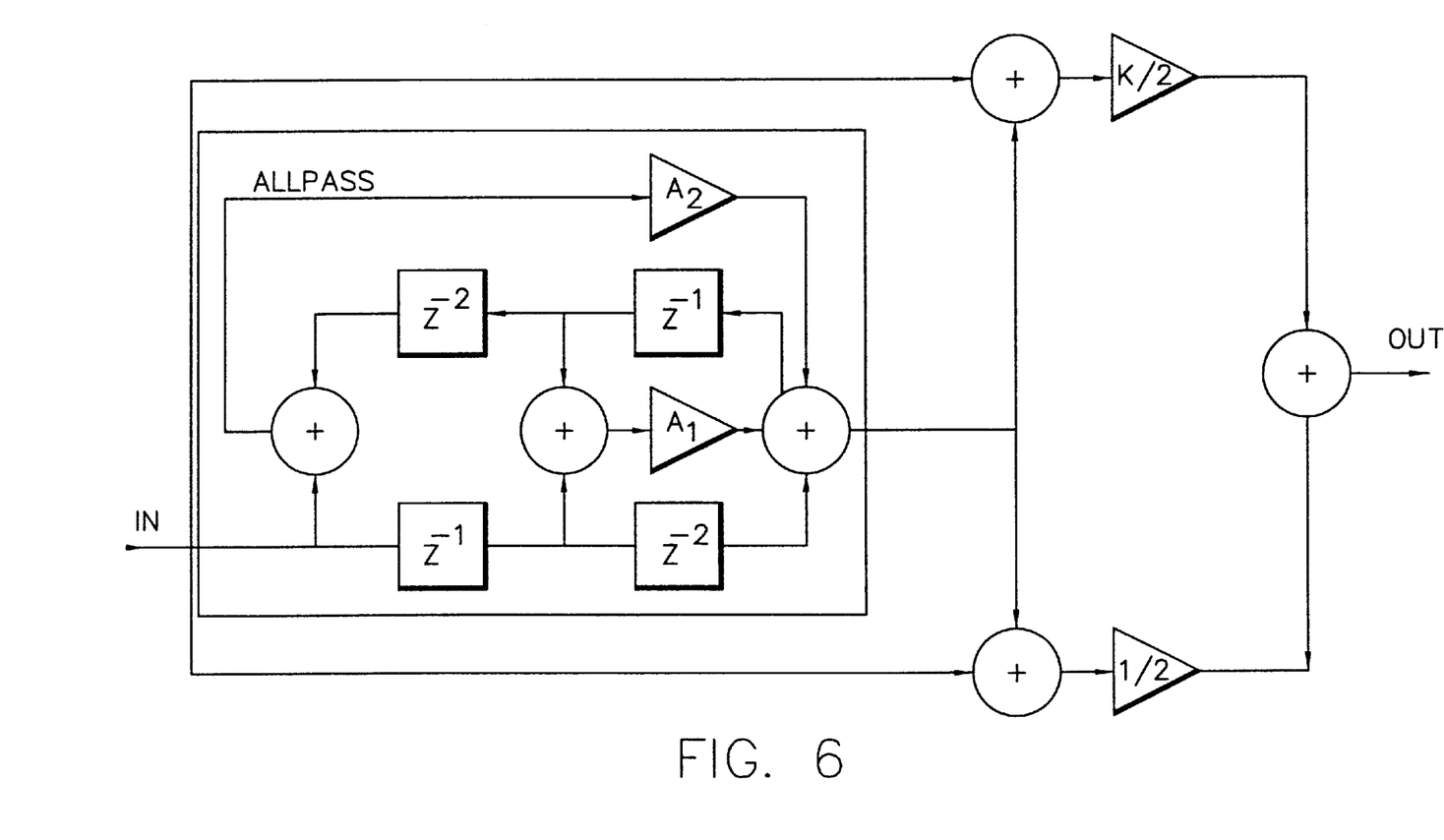
FIG. 6 is a block diagram of a filter that can be used in the equalizer according to the invention, FIG. 7 graphically illustrates frequency response scaling in the arrangement according to the invention, FIG. 8 graphically illustrates certain control curves that can applied in the arrangement according to the invention.

FIG. 6 shows an advantageous implementation of the equalizer block. In this known filter construction, blocks marked with Z represent delays of a time unit, a1 and a2 are factors affecting the center frequency and bandwidth of the frequency response, and the K factor corresponds to the equalization gain. The filter is presented by way of an example only, as the detailed implementation of the equalizer block 4 is not essential from the point of view of the invention. The advantages of the filter arrangement in FIG. 6 are: only three variable factors (a1, a2 and K), small effect on the signal phase, good and clear variability and good stability. The filter transfer function conforms to the formula control block 15 controls the equalizer block 4 so that the best possible signal quality and intelligibility are achieved.

Figure 7:
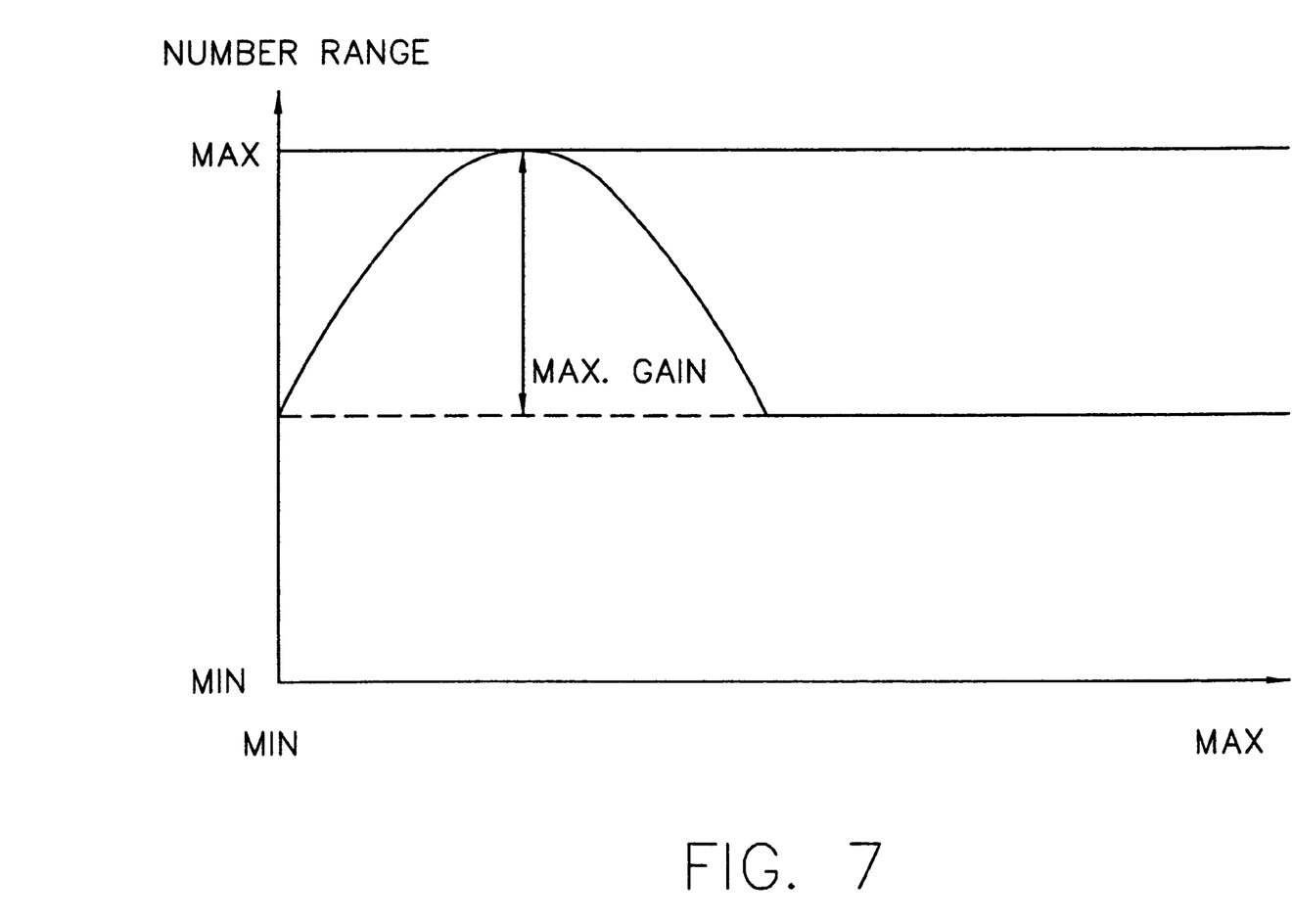

The simplest of the control parameters is the information about the phone volume set by the user. Most modern mobile phones include an adjusting device with which the user can increase or decrease the volume of the sound coming from the loudspeaker of the phone. In normal use, the user increases the volume if there is much noise in the operating environment, and decreases it if the operating environment is quiet. As was stated above, from the point of view of the quality of the received sound it is advantageous to emphasize low (about <1 kHz) frequencies in a quiet operating environment, but from the point of view of speech intelligibility it is advantageous to attenuate them in a noisy operating environment. The control block 15 receives the information about the position of the sound volume control in a known manner, whereby it alters the control information of the equalizer block 4. If an equalizer block according to FIG. 6 is used, a loud volume setting makes the control block 15 decrease factor K and, correspondingly, a quiet volume setting makes the control block increase that same factor. In an advantageous embodiment, the biggest possible K factor value corresponds to the biggest integer in the number representation of the signal processor 1, whereby the gain cannot be increased to the extent where it would result in a numeric overflow in the processor. FIG. 7 shows diagrammatically the gain of the equalizer block 4 as a function of frequency when the biggest possible K factor value is used.

A more detailed picture of the background noise is achieved by measuring it via the microphone 9. Many modern mobile phones include a so-called voice activity detection (VAD) function the task of which during a call is to detect when the user is speaking on the phone and when he is quiet. The normal use of this function is such that when the user is quiet the phone transmits only the minimum amount of control information, which reduces the power consumption of the phone and the load on radio frequencies. The VAD function can be applied to the method and device according to the invention because when the user is quiet, the microphone 9 records only background noise. By measuring the level of the background noise at those moments when the VAD unit (not shown) indicates to the control block 15 that the user is not speaking, and by storing the measurement result to be used as an estimate for the level of background noise until the completion of the next measurement result, the equalizer block 4 can be controlled in the same way as described above in conjunction with the sound volume set by the user. This requires that the phone, advantageously its digital signal processor, includes a background noise measuring block 13 from which the control block 15 gets the measurement results. In addition, there must be a connection from the VAD unit (not shown) to the control block 15, so that the latter knows when to receive the $$H = \frac{\left(\frac{1}{2}(a1 + 1 + K(a1 - 1)) + (a2 \cdot Z^{-1}) + \frac{1}{2}(1 + a1 + K(1 - a))Z^{-2}\right)}{1 + (a2 \cdot Z^{-1}) + (a1 \cdot Z^{-2})}$$

Next, we will describe the operation of the method and device according to the invention. The basic idea is that information is brought to the control block 15 in the form of control parameters indicating the operating conditions of the phone and the equipment connected to it, whereby the measurement results. The information from the VAD unit can also be brought as an on/off control to the background noise measuring block 13, whereby it gives measurement results to the control block 15 only when the user is quiet according to the VAD block.

Advantageously, the power level of the signal coming from the A/D converter 12 in the PCM block 2 is monitored in the background noise measurement. In the power level measurement it is advantageous to use some kind of averaging because sudden changes in the power level, particularly fast power peaks, might otherwise result in equalization changes so fast that they would affect the auditory impression in a negative manner. Measurement technology uses concepts called the attack and release time which describe the quickness of a system to react to the fact that the signal measured exceeds a certain limit value (attack) or goes below it (release). In the power level measurement, it is advantageous to use a relatively long attack time so as to avoid disturbances caused by fast power peaks, and a relatively short release time so that the system will react quickly enough to a sudden reduction in the background noise, e.g. when the car that is serving as the operating environment is stopped.

From the point of view of the user, the best way would be to measure, instead of the power level, the loudness, which is a quantity describing the human auditory perception related to power level changes. However, loudness measurement requires complex filter arrangements and frequency-dependent calculations, whereby the performance of the digital signal processor 1 may become a limiting factor. In the future, however, new, more efficient processors may have the required capacity, whereby known A- or F-weighting filters could be used.

The background noise measuring block 13 may also include a frequency analysis means, which measures, in addition to the intensity of background noise, also its frequency spectrum. On the basis of these measurement data, the frequency response of the equalizer block 4 can be changed so that the equalization of the speech signal compensates for the effect of noise at a particular frequency. This embodiment is advantageous especially if there is in the operating environment a machine which when running, produces noise which is accentuated at some particular frequency.

Mobile phones also include functions measuring the quality of the radio connection according to which a handover from a base station to another is performed. These measurement results can also be used in the method and device according to the invention to control the operation of the equalizer. In an advantageous embodiment, the main principle is that equalization is increased when the quality of the connection becomes worse, which manifests itself in the form of a decreasing field strength or unsuccessfully received consecutive frames. Other equalization strategies are also possible, and the best approach can be found by experimenting. The use of a control parameter or parameters describing the quality of the radio connection requires that there is a connection from the mobile phone part that measures the radio connection quality to the control block 15. This is easy to arrange because in known implementations many of the parameters describing the connection quality are calculated in the same digital signal processor that performs the speech decoding and in which the adaptive equalization according to the invention is advantageously located.

Reference number 18 in FIG. 2 represents a control parameter input that describes auxiliaries connected to the telephone. Certain auxiliaries, such as headphones and hands-free loudspeakers, require different equalization to achieve the best possible sound quality. In addition, when using e.g. a hands-free loudspeaker, the effect of the mobile phone's volume control is stronger than in the ordinary mobile phone use, which has to be taken into account when the equalization control is based only on the volume setting but the control block 15 also receives information about the connected auxiliary. In an advantageous embodiment, the optimum control information values of the equalizer block 4 for each auxiliary are measured by the manufacturer of the phone and stored in connection with the programming as a look-up table 4a in the memory means used by the control block 15 or by the equalizer block 4 directly. When the control block 15 receives a control parameter indicating that a certain auxiliary is connected to the phone, it reads from the memory means the corresponding control information values and sends them to the equalizer block 4.

In addition to those presented above, also other control parameters or corresponding techniques can be applied in the method and device according to the invention in order to change the operation of the equalizer block 4. For example, if the user has a hearing defect that requires a certain kind of equalization, the equalizer block 4 can be made to perform the correct equalization. In an advantageous embodiment of the invention, in which the functions inside the DSP block 1 are realized as programmable processes, it is easy to affect their operation even at the user level by programming the digital signal processor in the appropriate way.

Figure 8:
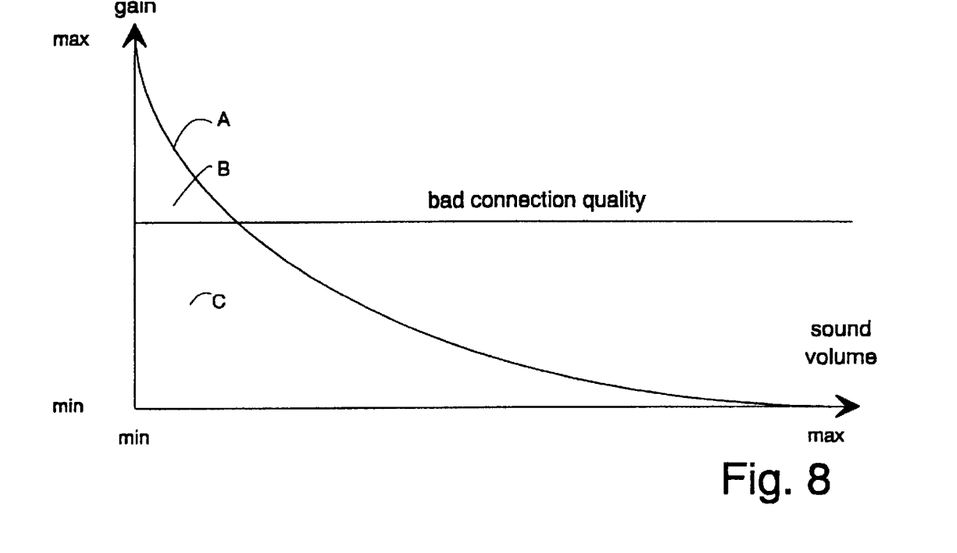

The interworking of the control parameters mentioned above has to be adapted so that it is logical and suites the varying operating situations and does not exceed the capacity of the digital signal processor 1. In an advantageous embodiment, the phone volume set by the user is directly related to the equalizer K factor, or gain, so that even a slight increase in the volume reduces the K factor, and vice versa. In FIG. 8, each of the curves A, B and C diagrammatically describes the change in the gain when the sound volume setting is changed but other conditions remain constant Background noise measurement in block 13 is performed in a stepwise manner, ie. the measured background noise power level is compared to certain threshold values. If a threshold value is exceeded, the K factor is scaled by a constant factor, which in FIG. 8 corresponds to skipping from curve A, B or C to another curve. For example, when the background noise exceeds a certain threshold value, there may occur a skip from curve B to curve C and, correspondingly, when the background noise gets quieter, there may occur a skip from curve A back to curve B or even directly to curve C. The attack and release time factors associated with the skips are discussed above.

If the quality of the radio connection is so bad that the parameter describing it exceeds a certain threshold level, it is possible to apply a certain constant gain, which does not depend on the sound volume set by the user, nor on the measured noise level. This is described by the straight line D in FIG. 8. As was stated above, it is possible to attempt to compensate for bad connection quality with another equalization strategy, and the best approach can be found by experimenting. In addition to the interworking forms presented above, the look-up table 4a also contains control information of the equalizer block 4 related to certain auxiliaries, which surpass the data relating to normal phone operation when an auxiliary is connected to the phone. Then the parameters controlling the equalization may change to a considerable extent all at once. During a call, when equalization is controlled according to the background noise and volume setting, it is preferable to avoid sudden changes in the operation of the equalizer block 4 because they might result in perceptible and disturbing changes in the sound heard by the user.

Figure 9:
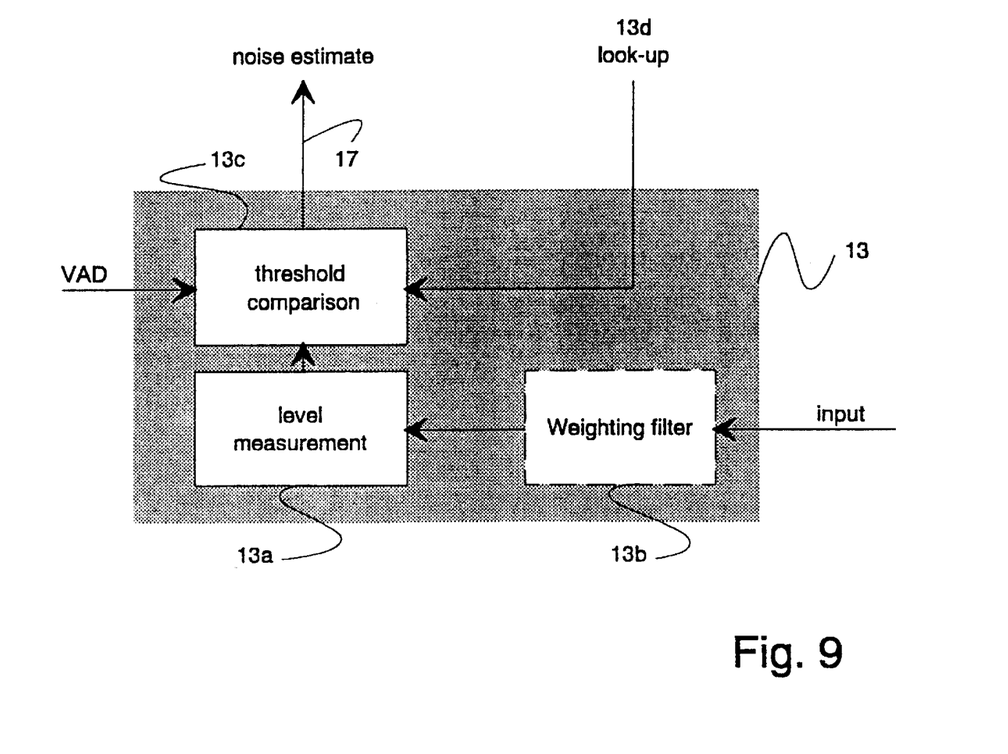
FIG. 9 is a block diagram depicting estimation of ambient noise for use in the arrangement according to the invention.

FIG. 9 shows schematically a more detailed implementation of the background noise measuring block 13. The actual power level measurement is performed in block 13a, which may be preceded by a weighting filter 13b, especially if it is desired to emphasize the noise measurement in the direction of loudness instead of the power level. Block 13c uses the signal from the VAD unit to determine whether or not the user is speaking, and compares the measured noise value to the threshold value obtained from the look-up table 13d. The noise level estimate can be an absolute value or a code value which refers to a range between certain threshold values.

The adjustment methods presented here which are based mainly on threshold value comparisons require that the digital signal processor 1 has access to a sufficient amount of memory, advantageously ROM memory, into which the threshold values and other look-up table data can be stored. The number of different combinations and alternative adjustment strategies is usually limited by the size of the ROM memory in use. The adjustment methods could be implemented even more flexibly if the control information of the equalizer block 4 were computed in real time, continuously taking into account all variable factors. This, however, requires a relatively large computing capacity, whereby the capacity and instruction sets of the present digital signal processors based on integer arithmetics could become limiting factors. In the future, more powerful processors are likely to create new possibilities in this respect.

Above it was discussed a digital mobile phone in order to illustrate the applicability of the invention. However, the invention is not limited to just mobile phones but can be used in all telephone apparatuses in which sound is handled digitally and which can utilize a control parameter presented here or a similar one in order to describe the conditions to which the equalization of the reproduced sound has to be adapted. In addition to mobile phones, the invention can be applied to e.g. digital cordless telephones that have sufficient signal processing means for implementing the equalization and the functions needed to control it. The control parameters discussed here are just examples in the respect that any one of them or any combination of them can be used to implement the adaptive equalization according to the invention. A person skilled in the art can also propose other functionally similar control parameters.

In an advantageous embodiment of the mobile phone according to the invention, it is taken into account when designing the PCM block 2 that the frequency-dependent operations performed in the equalizer block 4 affect the loudness perceived by the user. Particularly the amplifier/attenuator unit 7 in the PCM block has to be designed such that it can be used to prevent a possible unwanted change in the loudness caused by the equalization.

The method and device according to the invention meet the objectives set for them and represent a clear improvement when compared to the prior art as the adaptive equalization significantly enhances both the quality and intelligibility of the perceived sound in a given operating situation.

What is claimed is:

1. A method for improving the quality and intelligibility of sound reproduced by a telephone apparatus in which the reproduced sound is handled in a digital form and equalized according to a certain frequency response, wherein there is generated control information describing operating conditions of said telephone apparatus and the frequency response of said equalization is changed on the basis of said control information to optimize the quality and intelligibility of the sound reproduced in a given situation, wherein the telephone apparatus comprises an outgoing channel with a microphone for transmitting an outgoing signal to a distant location and an incoming channel for receiving an incoming signal, the method further comprising steps of:

generating the control information by sensing sound by said microphone at an input to the outgoing channel;

applying said equalization to said incoming signal;

adjusting said equalization in response to the control information obtained by the sensing of the sound at the input to the outgoing channel;

by said microphone, recording the sound to be transmitted via said outgoing channel, measuring noise recorded through said microphone, and employing data representing noise measured by said measuring step for generation of said control information by said generating step; and by use of voice activity detection means, determining whether or not a user is speaking on the telephone during a call, and conducting said noise measuring step only during those moments when the user is not speaking according to information from said voice activity detection means.

2. The method of claim 1, characterized in that the proportional intensity of a certain frequency area is changed in said equalization, and said changing of the frequency response includes at least one of the following measures: changing of the gain of said frequency area, changing of the width of said frequency area, changing of the center frequency of said frequency area.

3. The method of claim 1, characterized in that said control information includes a first information element which is formed on the basis of the phone sound volume (19) set by the user.

4. The method of claim 3, characterized in that said first information element describes the gain of the low-frequency part of the sound reproduced, whereby the gain is increased when the user turns the phone sound volume (19) down and the gain is decreased when the user turns the phone sound volume (19) up.

5. The method of claim 1, characterized in that said control information includes a second information element which is formed on the basis of the noise (17) measured in the operating environment of said telephone apparatus.

6. The method of claim 5, characterized in that said second information element describes the gain of the low-frequency part of the sound reproduced, whereby the gain is increased when the measurement shows that the noise (17) in the operating environment is low, and the gain is decreased when the measurement shows that there is a lot of noise (17) in the operating environment.

7. The method of claim 1, characterized in that said control information includes a third information element which is formed on the basis of the quality (16) of the communication connection between said telephone apparatus and the communication network.

8. The method of claim 7, characterized in that said equalization is changed on the basis of said third information element to compensate for the low quality of the communication connection.

9. The method of claim 8, characterized in that said third information element describes the gain of the low-frequency part of the sound reproduced, whereby the gain is increased when the quality (16) of said communication connection is bad, and the gain is decreased when the quality (16) of said communication connection is good.

10. A method for improving the quality and intelligibility of sound reproduced by a telephone apparatus in which the reproduced sound is handled in a digital form and equalized according to a certain frequency response, wherein there is generated control information describing the operating conditions of said telephone apparatus and the frequency response of said equalization is changed on the basis of said control information to optimize the quality and intelligibility of the sound reproduced in a given situation, the method further comprising recurrently the following steps:

a) without any special temporal order the first information element is generated according to how the user adjusts the phone sound volume, it is monitored when the user is not speaking during a call, and the noise in the operating environment of the phone is measured during such moments and the second information element is formed on the basis of the noise measurement, the quality of the connection between the telephone and the communication networked used via it is monitored and the third information element is formed accordingly, and b) according to the information elements formed the gain of the low-frequency part of the sound reproduced is changed inversely proportionally to the sound volume set by the user, whereby value pairs representing a certain sound volume and the corresponding gain form a monotonically falling curve (A;B;C;) in a system of coordinates where the gain is represented as a function of the sound volume setting, said gain is scaled inversely proportionally to measured noise, whereby said curve shifts downwards (A->B; B->C) in said system of coordinates when the noise increases and upwards (C->B; B->A) when the noise decreases, and if the connection between the communication network and the phone is bad, said gain of the low-frequency part is set constant, whereby it does not depend on the sound volume setting.

11. The method of claim 1, characterized in that said control information includes a fourth information element which is formed on the basis of auxiliaries (18) connected to said phone.

12. A telephone apparatus including a loudspeaker for the reproduction of sound and a digital signal processing means for the digital processing of the sound reproduced, which signal processing means includes an equalizer which has a certain frequency response, wherein said telephone apparatus includes means for the generation of control information describing its operating conditions and a means for changing the frequency response of said equalizer on the basis of said control information, wherein the telephone apparatus comprises:

an outgoing channel for transmitting an outgoing signal to a distant location and an incoming channel for receiving an incoming signal;

means for generating the control information by sensing sound at an input to the outgoing channel, the reproduced sound appearing at an output of the incoming channel, said equalization being applied to said incoming signal;

means for adjusting said equalization in response to the control information obtained by the sensing of the sound at the input to the outgoing channel;

a control block for collecting the data describing said operating conditions and for generating said control information;

a microphone for recording the sound to be transmitted via a telephone connection, noise measuring means for measuring noise recorded through said microphone, and means for conveying data representing noise measured by said measuring means to said control block for the generation of said control information; and voice activity detection means for determining whether or not a user is speaking on the phone during a call, and said noise measuring means is operative to measure noise only during those moments when the user is not speaking according to the information from said voice activity detection means.

13. The telephone apparatus of claim 12, characterized in that it includes a sound volume adjusting device (19) which can be used by the user and a means for conveying information about the sound volume set with said adjusting device to said control block (15) for the generation of said control information.

14. The telephone apparatus of claim 12, characterized in that said noise measuring means (13; 13a, 13b, 13c) include a weighting filter (13b) which weights noise measurement at certain frequencies.

15. The telephone apparatus of claim 12, characterized in that it includes a means for monitoring the quality (16) of the communication connection between it and the communication network and a means for conveying the information describing the quality of the connection to said control block (15) for the generation of said control information.

16. The telephone apparatus of claim 12, characterized in that it includes a digital signal processor (1) which includes said equalizer (4).

17. The telephone apparatus of claim 16, characterized in that said digital signal processor (1) also includes said control block (15).

18. The telephone apparatus of claim 16, characterized in that said digital signal processor (1) also includes said noise measuring means (13, 13a, 13b, 13c).

19. The telephone apparatus of claim 12, characterized in that it is a mobile phone in a digital cellular network.

20. The telephone apparatus of claim 12, characterized in that it includes a connecting means for the connection of auxiliaries and a means for conveying the information (18) describing the connected auxiliaries to said control block (15) for the generation of said control information.

21. The telephone apparatus of claim 20, characterized in that said auxiliaries include hands-free equipment.

22. A telephone apparatus including a loudspeaker for the reproduction of sound and a digital signal processing means for the digital processing of the sound reproduced, which signal processing means includes an equalizer which has a certain frequency response, wherein said telephone apparatus includes means for the generation of control information describing its operating conditions and a means for changing the frequency response of said equalizer on the basis of said control information;

wherein said equalizer realizes the transfer function $$H = \frac{\left(\frac{1}{2}(a1 + 1 + K(a1 - 1)) + (a2 \cdot Z^{-1}) + \frac{1}{2}(1 + a1 + K(1 - a))Z^{-2}\right)}{1 + (a2 \cdot Z^{-1}) + (a1 \cdot Z^{-2})}$$

wherein the Zs represent delays of a time unit and said control information comprises variable parameters K, a1 and a2, of which K represents the gain and a1 and a2 represent the center frequency and the bandwidth.

23. A method for improving the quality of sound reproduced by a receiver of a communications system which comprises also a transmitter, the method comprising steps of:

constructing the receiver with a filter having a passband extending across the spectrum of the incoming signal;

measuring ambient sonic noise level at the transmitter by use of a microphone of the transmitter to provide a measurement thereof, and employing the microphone for a transmission of speech from the system;

establishing a plurality of spectral shapes for said passband wherein an individual one of said spectral shapes defines a relationship between amplitude and frequency of a signal transmission characteristic of the filter;

providing a relationship between said spectral shapes and said ambient noise level for signal equalization;

selecting a spectral shape for said passband corresponding to the measurement of the ambient noise level;

generating control information from said measurement of the ambient noise level; and by use of voice activity detection means, determining whether or not a user is speaking on the telephone during a call, and conducting said noise measuring step only during those moments when the user is not speaking according to information from said voice activity detection means.

24. A method according to claim 23, further comprising steps of:

outputting a sonic signal from said receiver;

providing a relationship between said spectral shapes and a loudness of said sonic signal; and wherein said selecting step is based both on said relationship between said spectral shapes and said ambient noise level and said relationship between said spectral shapes and said loudness of said sonic signal.

25. A method according to claim 24 wherein the receiver is part of a mobile phone of the communication system.

26. A receiver circuit of a communications system having an incoming signal channel and a transmission signal channel, the receiving circuit serving to improve the quality of sound of an incoming signal reproduced by the receiver circuit in response to a measurement of an ambient noise signal at the transmission channel of the system, the circuit comprising:

a filter with a passband extending across the spectrum of the incoming signal, and being located in the incoming signal channel;

means for measuring ambient sonic noise level at an input to the transmission channel by a microphone of the transmission channel to provide a measurement of the ambient noise level;

means for establishing a plurality of spectral shapes for the passband wherein an individual one of the spectral shapes defines a relationship between amplitude and frequency of a signal transmission characteristic of the filter;

means for providing a relationship between spectral shapes of the passband and said ambient noise level, wherein the passband may have any one of a plurality of said spectral shapes, an individual one of the spectral shapes defining a relationship between amplitude and frequency of a signal transmission characteristic of the filter;

means responsive to the measurement of the ambient noise level for selecting one of said spectral shapes for said passband corresponding to the measurement of the ambient noise level to accomplish signal equalization of said incoming signal; and voice activity detection means for determining whether or not a user is speaking into the microphone during a call, and said noise measuring means is operative to measure noise only during those moments when the user is not speaking according to the information from said voice activity detection means.

27. A receiver circuit according to claim 26, further comprising:

means for outputting a sonic signal from said receiver;

means for providing a relationship between said spectral shapes and a loudness of said sonic signal; and wherein said selecting means is responsive both to said relationship between said spectral shapes and said ambient noise level and to said relationship between said spectral shapes and said loudness of said sonic signal.

28. A receiver circuit according to claim 27 wherein the receiver is part of a mobile phone of a communication system.

* * * * *